(12) United States Patent
Cai

(10) Patent No.: US 11,673,476 B2
(45) Date of Patent: *Jun. 13, 2023

(54) METHOD OF OPTIMIZING SYSTEM EFFICIENCY FOR BATTERY POWERED ELECTRIC MOTORS

(71) Applicant: Tula eTechnology, Inc., San Jose, CA (US)

(72) Inventor: Xiaoping Cai, Fremont, CA (US)

(73) Assignee: Tula eTechnology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/733,232

(22) Filed: Apr. 29, 2022

(65) Prior Publication Data

US 2023/0050789 A1     Feb. 16, 2023

Related U.S. Application Data

(63) Continuation of application No. 17/401,000, filed on Aug. 12, 2021, now Pat. No. 11,345,241.

(51) Int. Cl.
| | | |
|---|---|---|
| *B60L 15/20* | (2006.01) | |
| *B60L 58/24* | (2019.01) | |
| *H02P 6/08* | (2016.01) | |
| *B60L 58/12* | (2019.01) | |
| *B60L 15/08* | (2006.01) | |
| *B60L 15/04* | (2006.01) | |

(52) U.S. Cl.
CPC ........... *B60L 15/2045* (2013.01); *B60L 58/12* (2019.02); *B60L 58/24* (2019.02); *H02P 6/08* (2013.01);
(Continued)

(58) Field of Classification Search
CPC ...... B60L 15/2045; B60L 58/12; B60L 58/24; B60L 15/04; B60L 15/08; B60L 2240/12;
(Continued)

(56) References Cited

U.S. PATENT DOCUMENTS

| | | |
|---|---|---|
| 4,441,043 A | 4/1984 | DeCesare |
| 4,989,146 A | 1/1991 | Imajo |
| | (Continued) | |

FOREIGN PATENT DOCUMENTS

| | | |
|---|---|---|
| CN | 1829070 A | 9/2006 |
| CN | 102381265 A | 3/2012 |
| | (Continued) | |

OTHER PUBLICATIONS

International Search Report and Written Opinion for PCT/IB22/56551 dated Oct. 28, 2022.
(Continued)

*Primary Examiner* — Alan D Hutchinson
(74) *Attorney, Agent, or Firm* — Womble Bond Dickinson (US) LLP

(57) ABSTRACT

A method of controlling an electric motor to optimize system efficiency of an electric motor operable in a pulsed mode and a continuous mode is disclosed herein. The method includes receiving a requested torque for the electric motor, calculating a pulsed system efficiency, calculating a continuous system efficiency, and operating the electric motor in the pulsed mode when the pulsed system efficiency is greater than the continuous system efficiency. The pulsed system efficiency is calculated for delivering the requested torque from the electric motor in a plurality of torque pulses greater than the requested torque. The continuous system efficiency is calculated for delivering the requested torque from the electric motor as a continuous torque. The system efficiency may be at least partially based on a battery efficiency and a motor efficiency.

20 Claims, 5 Drawing Sheets

(52) U.S. Cl.
CPC .............. *B60L 15/04* (2013.01); *B60L 15/08* (2013.01); *B60L 2240/12* (2013.01); *B60L 2240/421* (2013.01); *B60L 2240/423* (2013.01); *B60L 2240/425* (2013.01)

(58) Field of Classification Search
CPC ......... B60L 2240/421; B60L 2240/423; B60L 2240/425; H02P 6/08
See application file for complete search history.

(56) References Cited

U.S. PATENT DOCUMENTS

| | | | |
|---|---|---|---|
| 5,099,410 | A | 3/1992 | Divan |
| 5,151,637 | A | 9/1992 | Takada et al. |
| 5,325,028 | A | 6/1994 | Davis |
| 5,483,141 | A | 1/1996 | Uesugi |
| 5,640,073 | A | 6/1997 | Ikeda et al. |
| 5,731,669 | A | 3/1998 | Shimizu et al. |
| 6,121,740 | A | 9/2000 | Gale et al. |
| 6,291,960 | B1 | 9/2001 | Crombez |
| 6,308,123 | B1 | 10/2001 | Ikegaya et al. |
| 6,370,049 | B1 | 4/2002 | Heikkil.ang. |
| 6,424,799 | B1 | 7/2002 | Gilmore |
| 6,493,204 | B1 | 12/2002 | Glidden et al. |
| 6,605,912 | B1 | 8/2003 | Bharadwaj et al. |
| 6,829,515 | B2 | 12/2004 | Grimm |
| 6,829,556 | B2 | 12/2004 | Kumar |
| 6,906,485 | B2 | 6/2005 | Hussein |
| 6,940,239 | B2 | 9/2005 | Iwanaga et al. |
| 7,190,143 | B2 | 3/2007 | Wei et al. |
| 7,259,664 | B1 | 8/2007 | Cho et al. |
| 7,327,545 | B2 | 2/2008 | Konishi |
| 7,411,801 | B2 | 8/2008 | Welchko et al. |
| 7,453,174 | B1 | 11/2008 | Kalsi |
| 7,558,655 | B2 | 7/2009 | Garg et al. |
| 7,577,511 | B1 | 8/2009 | Tripathi et al. |
| 7,616,466 | B2 | 11/2009 | Chakrabarti et al. |
| 7,768,170 | B2 | 8/2010 | Tatematsu et al. |
| 7,852,029 | B2 | 12/2010 | Kato et al. |
| 7,960,888 | B2 | 6/2011 | Ai et al. |
| 7,969,341 | B2 | 6/2011 | Robbe et al. |
| 3,020,651 | A1 | 9/2011 | Zillmer et al. |
| 8,099,224 | B2 | 1/2012 | Tripathi et al. |
| 8,768,563 | B2 | 7/2014 | Nitzberg et al. |
| 8,773,063 | B2 | 7/2014 | Nakata |
| 9,046,559 | B2 | 6/2015 | Lindsay et al. |
| 9,050,894 | B2 | 6/2015 | Banerjee et al. |
| 9,308,822 | B2 | 4/2016 | Matsuda |
| 9,495,814 | B2 | 11/2016 | Ramesh |
| 9,512,794 | B2 | 12/2016 | Serrano et al. |
| 9,630,614 | B1 | 4/2017 | Hill et al. |
| 9,702,420 | B2 | 7/2017 | Yoon |
| 9,758,044 | B2 | 9/2017 | Gale et al. |
| 9,948,173 | B1 | 4/2018 | Abu Qahouq |
| 10,060,368 | B2 | 8/2018 | Pirjaber et al. |
| 10,081,255 | B2 | 9/2018 | Yamada et al. |
| 10,256,680 | B2 | 4/2019 | Hunstable |
| 10,273,894 | B2 | 4/2019 | Fripathi |
| 10,291,168 | B2 | 5/2019 | Fukuta |
| 10,291,174 | B2 | 5/2019 | Irie et al. |
| 10,320,249 | B2 | 6/2019 | Okamoto et al. |
| 10,344,692 | B2 | 7/2019 | Nagashima et al. |
| 10,381,968 | B2 | 8/2019 | Agirman |
| 10,476,421 | B1 | 11/2019 | Khalil et al. |
| 10,550,776 | B1 | 2/2020 | Leone et al. |
| 10,742,155 | B2 | 8/2020 | Tripathi |
| 10,944,352 | B2 | 3/2021 | Mazda et al. |
| 11,088,644 | B1 | 8/2021 | Carvell |
| 11,133,767 | B2 | 9/2021 | Serrano et al. |
| 11,345,241 | B1 | 5/2022 | Cai |
| 2001/0039926 | A1 | 11/2001 | Kobayashi et al. |
| 2002/0043954 | A1 | 4/2002 | Hallidy |
| 2005/0127861 | A1 | 6/2005 | McMillan et al. |
| 2005/0151437 | A1 | 7/2005 | Ramu |
| 2005/0160771 | A1 | 7/2005 | Hosoito et al. |
| 2007/0216345 | A1 | 9/2007 | Kanamori |
| 2007/0287594 | A1 | 12/2007 | DeGeorge et al. |
| 2008/0129243 | A1 | 6/2008 | Nashiki |
| 2008/0179980 | A1 | 7/2008 | Dawsey et al. |
| 2009/0045691 | A1 | 2/2009 | Ichiyama |
| 2009/0121669 | A1 | 5/2009 | Hanada |
| 2009/0128072 | A1 | 5/2009 | Strong et al. |
| 2009/0146615 | A1 | 6/2009 | Zillmer et al. |
| 2009/0179608 | A1 | 7/2009 | Welchko et al. |
| 2009/0306841 | A1 | 12/2009 | Miwa et al. |
| 2010/0010724 | A1 | 1/2010 | Tripathi et al. |
| 2010/0201294 | A1 | 8/2010 | Yuuki et al. |
| 2010/0296671 | A1 | 11/2010 | Khoury et al. |
| 2011/0029179 | A1 | 2/2011 | Miyazaki et al. |
| 2011/0089774 | A1 | 4/2011 | Kramer |
| 2011/0101812 | A1 | 5/2011 | Finkle et al. |
| 2011/0130916 | A1 | 6/2011 | Mayer |
| 2011/0208405 | A1 | 8/2011 | Tripathi et al. |
| 2012/0056569 | A1 | 3/2012 | Takamatsu et al. |
| 2012/0112674 | A1 | 5/2012 | Schulz et al. |
| 2012/0169263 | A1 | 7/2012 | Gallegos-Lopez et al. |
| 2012/0217921 | A1 | 8/2012 | Wu et al. |
| 2013/0002173 | A1 | 1/2013 | Baglino et al. |
| 2013/0134912 | A1 | 5/2013 | Khalil et al. |
| 2013/0141027 | A1 | 6/2013 | Nakata |
| 2013/0226420 | A1 | 8/2013 | Pedlar et al. |
| 2013/0241445 | A1 | 9/2013 | Tang |
| 2013/0258734 | A1 | 10/2013 | Nakano et al. |
| 2014/0018988 | A1 | 1/2014 | Kitano et al. |
| 2014/0028225 | A1 | 1/2014 | Takamatsu et al. |
| 2014/0130506 | A1 | 5/2014 | Gale et al. |
| 2014/0176034 | A1 | 6/2014 | Matsumura et al. |
| 2014/0217940 | A1 | 8/2014 | Kawamura |
| 2014/0265957 | A1 | 9/2014 | Hu et al. |
| 2014/0292382 | A1 | 10/2014 | Ogawa et al. |
| 2014/0354199 | A1 | 12/2014 | Zeng et al. |
| 2015/0025725 | A1 | 1/2015 | Uchida |
| 2015/0240404 | A1 | 8/2015 | Kim et al. |
| 2015/0246685 | A1 | 9/2015 | Dixon et al. |
| 2015/0261422 | A1 | 9/2015 | den Haring et al. |
| 2015/0297824 | A1 | 10/2015 | Cabiri et al. |
| 2015/0318803 | A1 | 11/2015 | Wu |
| 2016/0114830 | A1 | 4/2016 | Dixon et al. |
| 2016/0226409 | A1 | 8/2016 | Ogawa |
| 2016/0233812 | A1 | 8/2016 | Lee et al. |
| 2016/0269225 | A1 | 9/2016 | Kirchmeier et al. |
| 2016/0373047 | A1 | 12/2016 | Loken et al. |
| 2017/0087990 | A1 | 3/2017 | Neti et al. |
| 2017/0163108 | A1 | 6/2017 | Schencke et al. |
| 2017/0331402 | A1 | 11/2017 | Smith et al. |
| 2018/0032047 | A1 | 2/2018 | Nishizono et al. |
| 2018/0045771 | A1 | 2/2018 | Kim et al. |
| 2018/0154786 | A1 | 6/2018 | Wang et al. |
| 2018/0276913 | A1 | 9/2018 | Garcia et al. |
| 2018/0323665 | A1 | 11/2018 | Chen et al. |
| 2018/0334038 | A1 | 11/2018 | Zhao et al. |
| 2019/0058374 | A1 | 2/2019 | Enomoto et al. |
| 2019/0288629 | A1 | 9/2019 | Tripathi |
| 2019/0288631 | A1 | 9/2019 | Tripathi |
| 2019/0341820 | A1 | 11/2019 | Krizan et al. |
| 2020/0212834 | A1 | 7/2020 | Mazda et al. |
| 2020/0262398 | A1 | 8/2020 | Sato et al. |
| 2020/0328714 | A1 | 10/2020 | Tripathi |
| 2020/0343849 | A1 | 10/2020 | Coroban-Schramel |
| 2020/0366223 | A1 | 11/2020 | Coroban-Schramel |
| 2021/0203263 | A1 | 7/2021 | Serrano et al. |
| 2021/0351733 | A1 | 11/2021 | Carvell |

FOREIGN PATENT DOCUMENTS

| | | | |
|---|---|---|---|
| CN | 104716754 | A | 6/2015 |
| CN | 204589885 | U | 8/2015 |
| CN | 105196877 | A | 12/2015 |
| CN | 205229379 | U | 5/2016 |
| CN | 106932208 | A | 7/2017 |
| CN | 107067780 | A | 8/2017 |
| CN | 207129052 | U | 3/2018 |
| CN | 108216026 | A | 6/2018 |
| CN | 108445386 | A | 8/2018 |

(56) References Cited

FOREIGN PATENT DOCUMENTS

| | | | |
|---|---|---|---|
| CN | 110212725 A | 9/2019 |
| DE | 102014206342 A1 | 10/2015 |
| EP | 2605398 A1 | 6/2013 |
| FR | 2989479 B1 | 3/2014 |
| JP | 10-243680 A | 9/1998 |
| JP | 2008-079686 A | 4/2008 |
| JP | 2009-065758 A | 3/2009 |
| JP | 2011-67043 A | 3/2011 |
| JP | 2014-033449 A | 2/2014 |
| JP | 2017-011970 A | 1/2017 |
| JP | 2017-200382 A | 11/2017 |
| JP | 2018-033250 A | 3/2018 |
| KR | 10-2010-0021146 A | 2/2010 |
| KR | 10-2017-0021146 A | 2/2017 |
| KR | 10-2017-0032976 A | 3/2017 |
| WO | 03/36787 A1 | 5/2003 |
| WO | 2011086562 A1 | 7/2011 |
| WO | 2012-010993 A2 | 1/2012 |

OTHER PUBLICATIONS

Cai et al., "Torque Ripple Reduction for Switched Reluctance Motor with Optimized PWM Control Strategy", Energies,; vol. 11, Oct. 15, 2018, pp. 1-27.
Carvell et al, U.S. Appl. No. 17/204,269, filed Mar. 17, 2021.
Carvell, U.S. Appl. No. 16/866,917, filed May 5, 2020.
Carvell, U.S. Appl. No. 17/188,189, filed Mar. 1, 2021.
Islam, U.S. Appl. No. 17/220,228, filed Apr. 1, 2021.
Luckjiff et al., "Hexagonal$Sigma Delta$Modulators in Power Electronics", IEEE Transactions on Power Electronics,; vol. 20, No. 5, Sep. 2005, pp. 1075-1083.
Mirzaeva et al.,"The use of Feedback Quantizer PWM for Shaping Inverter Noise Spectrum", Power Electronics and; Motion Control Conference (EPE/PEMC), 2012 15th International IEEE, Sep. 4, 2012, pp. DS3c. 10-1,; XP032311951, DOI: 10.1109/EPEPEMC. 2012.6397346, ISBN: 978-1-4673-1970.6.
Ramsey, "How this father and son's new electric turbine could revolutionize electric cars; The Hunstable Electric; Turbine can produce up to three times the torque of any other motor", Available Online at; <https://www.autoblog.com/2020/03/08/hunstable-electric-turbine/>, Mar. 8, 2020, 9 pages.
Serrano et al, U.S. Appl. No. 16/689,450, filed Nov. 20, 2019.
Spong et al., "Feedback Linearizing Control of Switched Reluctance Motors", IEEE Transactions on Automatic; Control, vol. AC-32, No. 5, May 1987, pp. 371-379.
Srinivasan, U.S. Appl. No. 17/158,230, filed Jan. 26, 2021.
Srinivasan, U.S. Appl. No. 17/188,509, filed Mar. 1, 2021.
Tripathi, U.S. Appl. No. 16/353,159, filed Mar. 14, 2019.
Tripathi, U.S. Appl. No. 16/912,313, filed Jun. 25, 2020.
Tripathi, U.S. Appl. No. 16/353,166, filed Mar. 14, 2019.

PULSE CONTROL A

PULSE CONTROL B

METHOD OF OPTIMIZING SYSTEM EFFICIENCY FOR BATTERY POWERED ELECTRIC MOTORS

CROSS-REFERENCE TO RELATED APPLICATION

This application is a continuation of U.S. patent application Ser. No. 17/401,000, filed Aug. 12, 2021. The entire contents of which are hereby incorporated by reference.

BACKGROUND

1. Technical Field

The present disclosure relates to methods of optimizing system efficiency for battery powered electric motors, and more specifically, to optimizing system efficiency for pulsed electric motors powered by batteries.

2. Discussion of Related Art

Electric motors are known to be efficient at providing continuous torque to driven equipment. The torque delivery of electric motors is typically continuous without the pulsations associated with an internal combustion engine. Generally, electric motors have an optimal efficiency point in mid-low to mid-high range of torque relative to a maximum torque of the electric motor. For example, the maximum efficiency of an electric motor may be in a range of 30% to 80% of the maximum torque of the electric motor.

When an electric motor provides a continuous torque in a low range of the maximum torque of the electric motor, e.g., below 20% of the maximum torque, the efficiency of the electric motor is typically low. It has been found that reducing a duty cycle of the electric motor by pulsing the electric motor at the optimal efficiency point can provide a target torque in a low range of the electric motor at a higher motor efficiency than providing a continuous torque from the electric motor. The pulsing of the electric motor at the optimal efficiency point includes delivering pulses at a modulation frequency.

While pulsing the electric motor at a modulation frequency may have a higher motor efficiency than continuous torque delivery, the pulsing of the electric motor can reduce battery efficiency of the battery system providing power to the electric motor.

SUMMARY

There is a need to optimize system efficiency for pulsed electric motors such that increasing the motor efficiency does not decrease the overall system efficiency as a result of decreased battery efficiency.

This disclosure relates generally to a systems and methods for optimizing a system efficiency by calculating a pulsed system efficiency for a requested pulsed power request and comparing the pulsed system efficiency to a continuous system efficiency and switching the electric motor to a pulsed mode when the pulsed system efficiency is greater than the continuous system efficiency. The pulsed system efficiency and the continuous system efficiency may be calculated by a product of battery efficiency and motor efficiency for conditions of the pulsed motor mode and the continuous motor mode.

In an embodiment of the present disclosure, a method of controlling an electric motor includes receiving a requested torque for an electric motor, calculating pulsed system efficiency, calculating a continuous system efficiency, and operating the electric motor in the pulsed mode when the pulsed system efficiency is greater than the continuous system efficiency. Calculating the pulsed system efficiency is calculated for delivering the requested torque from the electric motor in a pulsed mode. Calculating the continuous system efficiency is calculated for delivering the requested torque from the electric motor in a continuous mode.

In embodiments, calculating the pulsed system efficiency may include determining the pulsed battery efficiency at least partially based on a dissipation heat loss of the battery. Calculating the pulsed system efficiency may include determining the pulsed battery efficiency at least partially based on a battery temperature, a pulsing current, battery terminal voltage, or battery internal resistance.

In another embodiment of the present disclosure, a non-transitory computer-readable medium having instructions stored thereon that, when executed by a controller, cause the controller to calculate a pulsed system efficiency, calculate a continuous system efficiency, and operate an electric motor in the pulsed mode when the pulsed system efficiency is greater than the continuous system efficiency. The controller calculates the pulsed system efficiency by determining the system efficiency for delivering a requested torque from an electric motor in a pulsed mode. The controller calculates the continuous system efficiency by determining the system efficiency for delivering the requested torque from the electric motor in a continuous mode.

In another embodiment of the present disclosure, a controller for operating an electric motor to rotate a driven component includes a processor and a memory including a program to cause the processor to calculate a pulsed system efficiency for delivering a requested torque form an electric motor in a pulsed mode, calculate a continuous system efficiency for delivering the requested torque from the electric motor in a continuous mode, and operate the electric motor in the pulsed mode when the pulsed system efficiency is greater than the continuous system efficiency.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described herein below with reference to the drawings, which are incorporated in and constitute a part of this specification, wherein.

DETAILED DESCRIPTION

Figure 1:
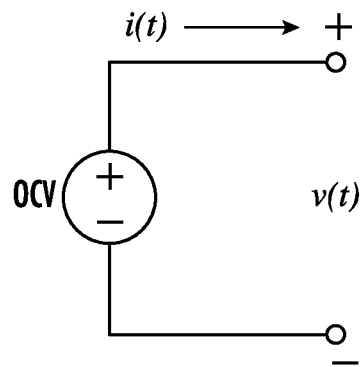
FIG. 1 is a schematic of an Ideal Voltage Source Model.

The present disclosure will now be described more fully with reference to example embodiments with reference to the drawings in which like reference numerals designate identical or corresponding elements in each of the several views. These example embodiments are described so that this disclosure will be thorough and complete, and will fully convey the scope of the disclosure to those with ordinary skill in the technology at the time of the invention. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth below; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

To increase efficiencies of an electric motor in a low torque range of the electric motor, the electric motor may be pulsed to reduce a duty cycle of the electric motor to provide a target torque or demand torque as an average torque delivered over time by pulsing the electric motor at an optimal efficiency point or torque at a modulation frequency. This pulsing of the electric motor may have a Pulse Width Modulation (PWM) waveform of torque delivery. The duty cycle is selected to provide a low target torque to the driven equipment while pulsing the electric motor at the optimal efficiency point. The modulation frequency may be selected to satisfy noise, vibration, and harshness (NVH) requirements and/or to reduce or minimize transition losses between an off-state and an on-state of the electric motor. In certain embodiments, the modulation frequency is selected based on a torsional vibration of the driven equipment For example, an electric motor may be pulsed at an efficient torque of 200 Nm with a 20% duty cycle to provide a target average torque of 40 Nm to driven equipment. Depending on the NVH characteristics of the driven equipment, the 200 Nm pulses may be delivered at a modulation frequency of 30 Hertz (Hz). In an exemplary electric motor, in certain operating condition, pulsing the electric motor to lower a duty cycle to deliver the target torque has been shown to increase motor efficiency by 9% when compared to providing torque demanded through continuous torque delivery.

As discussed above, pulsing the electric motor to deliver target torques below an optimum efficiency point has been shown to increase motor efficiency. However, the pulsing of the electric motor may also affect an efficiency of the battery system providing energy to the electric motor. For example, when an electric motor is pulsed to increase motor efficiency, losses of the battery system may increase and thus, the battery efficiency may decrease as a result of the pulsed energy delivery to the electric motor. This loss of battery efficiency may reduce, offset, or be greater than any motor efficiency gain such that system efficiency of a battery system and electric motor may be decreased from the pulsed energy delivery even if the there is a gain in motor efficiency. As detailed herein below, a method of preventing system efficiency losses as a result of pulsing an electric motor is disclosed. As used herein, the term "system efficiency" is the efficiency of the entire power delivery system including at least the motor efficiency of the electric motor and the battery efficiency of the battery system providing energy to the electric motor.

One method of quantifying an efficiency of the battery system is to determine a heat dissipation of the battery system. The heat dissipation of a battery system may be a function of internal resistance of the battery system and passing current through the battery system. The heat dissipation may also be affected by the terminal voltage of the battery system. For example, as the terminal voltage decreases such that the overpotential increases the current increases to provide the same power output. As a result, as the terminal voltage decreases, the heat dissipation may also increase. As used herein, the term battery system may refer to the battery having a single cell or a plurality of cells. Attributes of the battery system may refer to the battery system as a whole or to individual cells of the battery system.

There are several models for estimating the dissipated heat loss of a battery system. Referring to FIG. 1, an Ideal Voltage Source Model where v(t)=OCV provides a starting point but is clearly inadequate to fully model a dissipated heat loss of a battery system. For example, in the Ideal Voltage Source Model voltage is not a function of current, voltage is not a function of past usage, and voltage is constant. As such, a more accurate model is needed.

Figure 2:
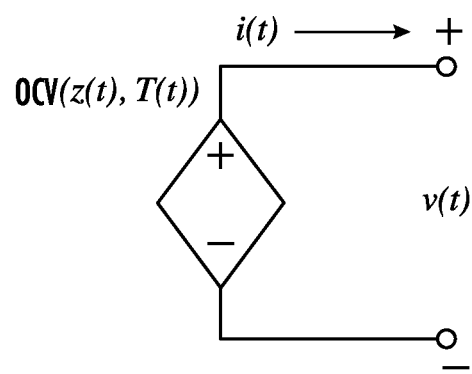
FIG. 2 is a schematic of an Ideal Voltage Source Model including a State of Charge.

Referring now to FIG. 2, a second model for estimating the dissipated heat loss of a battery system may be an Ideal Voltage Source Model including a State of Charge (SOC). In such a model, the state of charge z may be equal to 100 percent when a battery cell is fully charged and may be equal to 0 percent when the cell is fully discharged. The SOC may be modeled as follows:

$$\dot{z}(t) = -i(t)/Q$$

$$z(t) = z(t_0) - \frac{1}{Q}\int_{t_0}^{t} i(\tau)\,d\tau$$

where Q is the total capacity which is the total amount of charge removed when discharging from fully charged to fully discharged. It is known that battery cells are not perfectly efficient. For example, a battery cell has an energy efficiency that is defined as energy out divided by energy in. This energy efficiency may be around 95 percent for battery cells. The energy lost may be a result of resistive heating during charging and discharging. In addition, during charging, battery cell energy may be lost due to the Coulombic efficiency being less than 1 as a result of unwanted side reactions within the battery cells. However, during discharging of the battery cells, the Coulombic efficiency is generally equal to 1.

Figure 3:
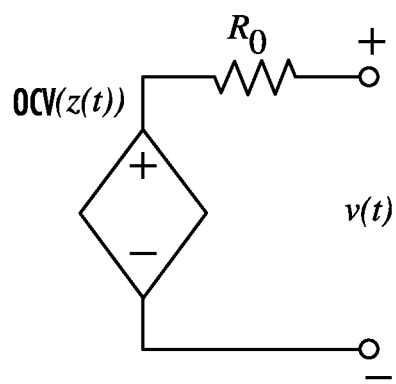
FIG. 3 is a schematic of a Rint Model.

With reference to FIG. 3, a third model for estimating the dissipated heat loss of a battery system may be the "Rint" Model which is shown including a series resistance. The Rint Model may be modeled as follows:

$$V(t) = OCV(z(t), T(t)) - i(t)R0$$

where $V(t) > OCV(z(t), T(t))$ on charge and $V(t) < OCV(z(t), T(t))$ on discharge. The power dissipated by $R_0$ is dissipated by heat which represents dissipated heat loss. While this Rint Model may be sufficient for simple electronic designs, this Rint Model may have inaccuracies when applied to advanced electronics and EV applications. For example, a battery cell may have diffusion processes within the cell such when a cell rests, the voltage does not immediately return to OCV.

While there may be more advanced models that take into account diffusion voltages and hysteresis such as a "Thevenin Model" or an Enhanced Self-Correcting (ESC) Cell Model, the Rint Model may give some insight as to changes in the dissipated heat loss within a battery cell in a continuous power delivery versus a pulsed power delivery. These and other models may be used in implementation of the methods detailed herein.

Figure 4:
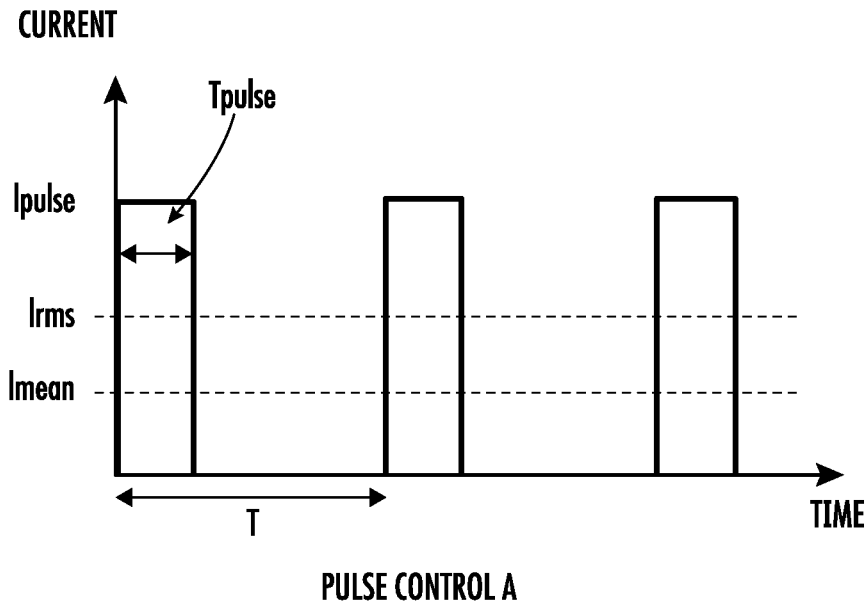
FIG. 4 is an illustration of a first pulse control pattern provided in accordance with the present disclosure.

Referring now to FIG. 4, a first pulse control pattern is provided in accordance with the present disclosure. In the first pulse control pattern, a target torque is delivered by providing a pulse current $I_{pulse}$ to pulse an electric motor at a pulse torque. The target torque is the average of the pulse torque over time or the product of a duty cycle of the pulse torque and a value of the pulse torque. The current delivered to the electric motor has a mean current $I_{pulse}$ which is the average current provided to the electric motor over time and a root mean square current Inns.

To calculate the dissipated heat loss of the pulsed power delivery, the first step is to calculate heat dissipated by providing power during continuous current delivery referred to generally as $Q_{baseline}$. Using the Rint Model above, $Q_{baseline}$ can be calculated as follows:

$$\int_0^T I_{mean} dt = I_{mean}^2 T.$$

Then turning to the first pulse control model, the dissipated heat loss Q can be calculated where:

$$T_{pulse} = \frac{1}{n}T \ge I_{pulse} = nI_{mean}$$

such that:

$$Q = \int_0^T I_{rms}^2 dt = \int_0^{\frac{T}{n}} (nI_{mean})^2 dt = nI_{mean}^2 T = nQ_{baseline}.$$

As such, the pulse width or duty cycle of the of the electric motor in pulsed mode is directly proportional to the baseline dissipated heat loss of the battery system in the continuous mode. For example, when the duty cycle is 33% or the pulse width is ⅓ of time T, n is equal to 3. When n is equal to 3, a $I_{mean}$ is ⅓ of $I_{pulse}$. Thus, from the Rint Model, when the pulse control pattern has a duty cycle of 33 percent, the dissipated heat loss of the battery system is three times greater than the dissipation heat loss of a constant power delivery from the battery system baseline. From the Rint Model it is clear that as the duty cycle decreases, the efficiency of the battery system decreases for the first pulse control pattern.

Figure 5:
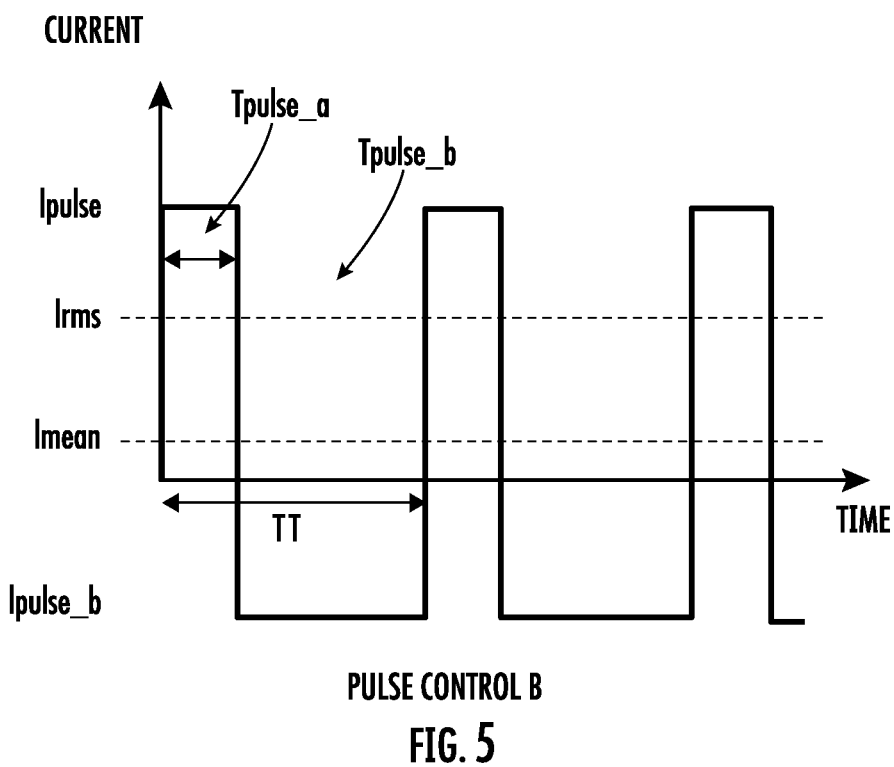
FIG. 5 is an illustration of a second pulse control pattern provided in accordance with the present disclosure.

With reference now to FIG. 5, a second pulse control pattern is provided in accordance with the present disclosure. In the second pulse control pattern, a target torque is delivered by providing a first pulse current $I_{pulseA}$ to pulse an electric motor at a pulse torque and receiving a second pulse current $I_{pulseB}$ from the electric motor. This pattern may be the result of pulsing the electric motor at a high positive torque and regenerating or recapturing energy between the positive torque pulses. This pattern creates a large gap between the $I_{rms}$ and the $I_{mean}$. The heat dissipation loss of the second pattern is greater than n times $Q_{baseline}$. In the examples shown below, the dissipation heat loss from the second pulse control pattern may be 10 times greater than baseline dissipation heat loss of constant current delivery to the electric motor.

Figure 6:
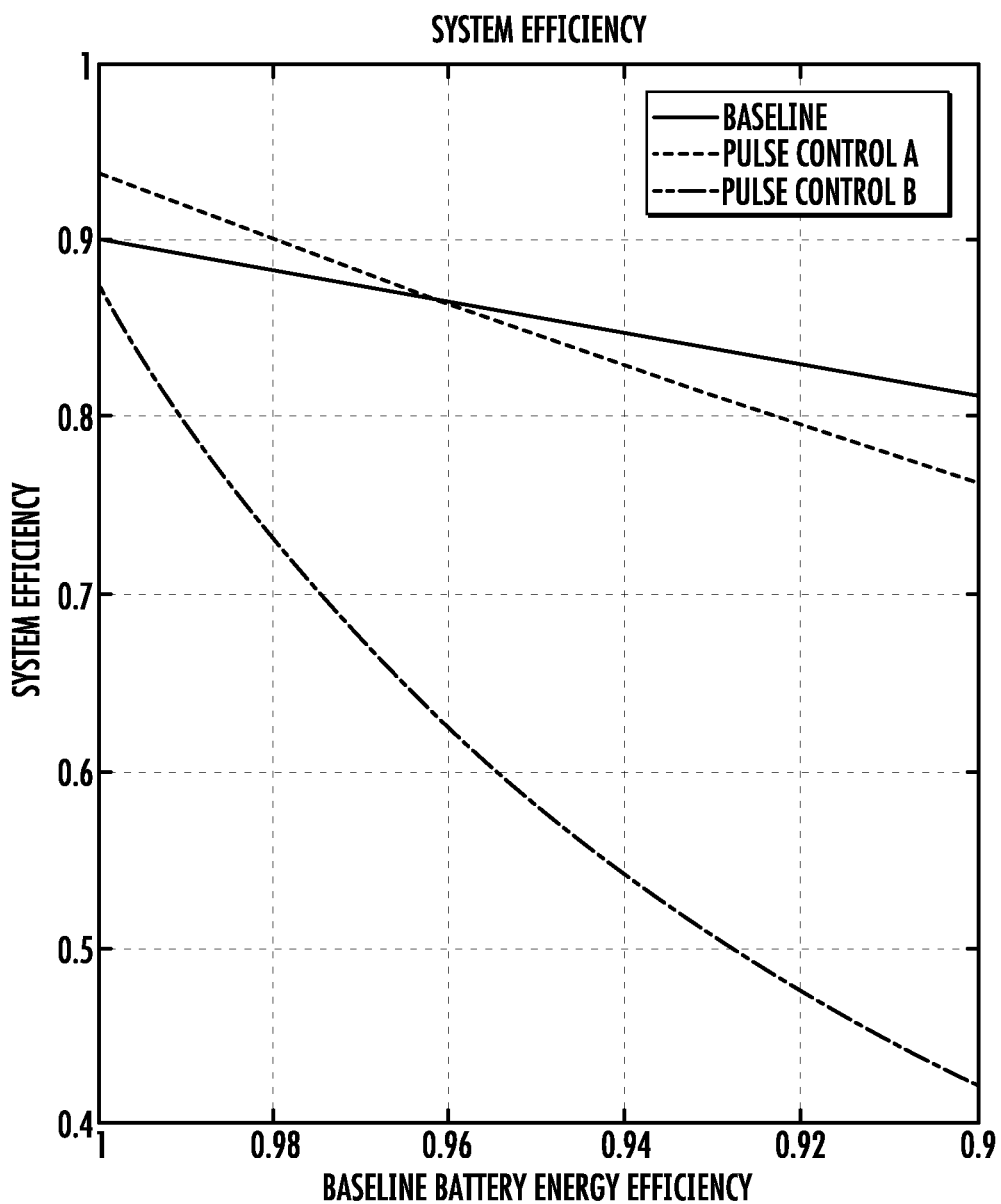
FIG. 6 is a chart of a system efficiency as a function of a battery efficiency provided in accordance with an embodiment of the present disclosure.

FIG. 6 shows System Efficiency as a factor of baseline Battery Efficiency for each of continuous torque delivery or Baseline, the first pulse control pattern, and the second pulse control pattern. Using the Rint model detailed above, there is a crossover point for where pulsing an electric motor may increase an overall system efficiency compared to a baseline of continuous torque delivery. This is shown that on the left side of the crossover point, the gains of motor efficiency from pulsed torque delivery are greater than a decrease in battery efficiency and on the other side of the crossover point, the battery efficiency offsets any potential motor efficiency gains. It is also shown that on the right side of the crossover point, the decrease in battery system efficiency is greater than the gains in motor efficiency from the pulsed mode.

Figure 7:
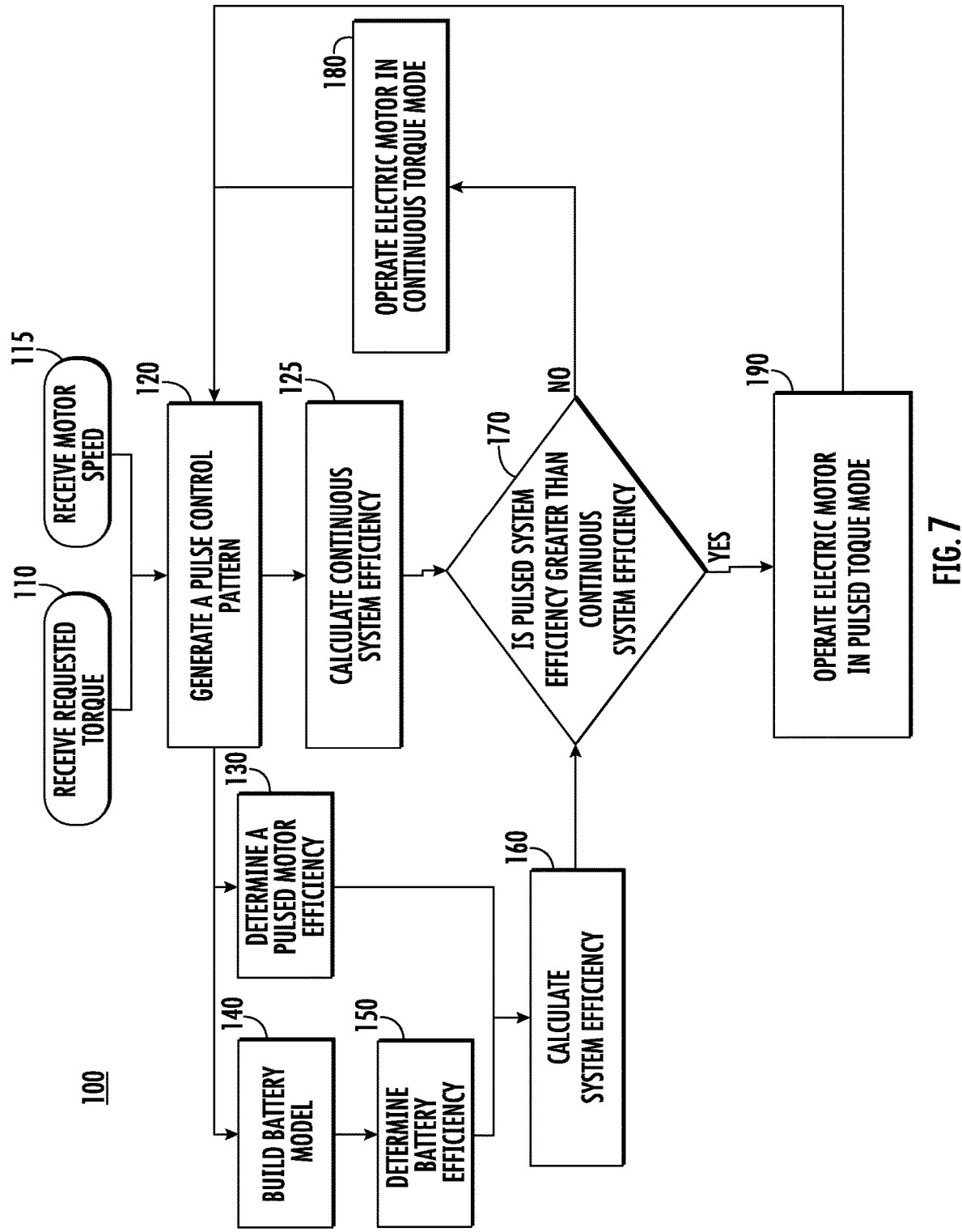
FIG. 7 is a flow chart of a method of optimizing system efficiency for a pulsed electric motor provided in accordance with an embodiment of the present disclosure.

Referring now to FIG. 7, a method of optimizing system efficiency for a pulsed electric motor is disclosed in accordance with the present disclosure and is referred to generally as method 100. The method 100 is executed on a controller that provides signals to an electric motor to deliver a target torque to a drive component.

The method 100 may include a controller of the electric motor receiving an input signal requesting a target torque from the electric motor (Step 110). The controller may also receive a motor speed from one or more sensors associated with the motor (Step 115). The controller generates a pulse control pattern in response to receiving the target torque for the electric motor (Step 120). The generated pulse control pattern may be at least partially based on a motor speed. Additionally or alternatively, the generated pulse control pattern may be at least partially based on operating conditions of the electric motor including, but not limited to a vehicle speed or a motor temperature. The controller may optimize the generated pulse control pattern to maximize motor efficiency of the electric motor and determine a motor efficiency gain as a result of the generated pulse control pattern when compared to continuous torque delivery (Step 130).

Before the generated pulse control pattern is provided to the electric motor, the controller calculates a system efficiency of the generated pulse control pattern (Step 160). To calculate the system efficiency, the controller requires at least the motor efficiency (Step 130) and a battery efficiency (Step 150). As such, the system efficiency is at least partially dependent on the motor efficiency and at least partially dependent on the battery efficiency. The battery efficiency of the pulsed power request is calculated using a battery model (Step 140). The battery model may be any battery model including, but not limited to, an Ideal Voltage Source Model, a SOC Model, a Rint Model, a Thevenin Model, or an ESC Model. The battery model may be based at least partially on operating conditions of the battery or cell including, but not limited to the generated pulse pattern, a cell current, a cell terminal voltage, a cell temperature, a cell internal resistance, or pulsing current. The battery model may include input of real-time operating conditions provided by one or more sensors. With the operating conditions, the battery efficiency is calculated using the battery model (Step 150).

With the battery efficiency and the motor efficiency calculated, the pulsed system efficiency is calculated for the generated pulse pattern (Step 160). The controller compares the pulsed system efficiency to a continuous or baseline system efficiency (Step 170). The continuous system efficiency may be calculated by the controller from a battery efficiency and a motor efficiency of continuous torque delivery of the target torque (Step 125). When the continuous system efficiency is greater than the pulsed system efficiency, the controller operates the electric motor to deliver the target torque via continuous torque delivery (Step 180). When the pulsed system efficiency is greater than or equal to the continuous system efficiency, the controller operates the electric motor to deliver the target torque via the generated pulse pattern (Step 190). The target torque delivery of Step 180 or Step 190 continues until another target torque is requested and received by the controller (Step 110). The method 100 is repeated for the new target torque requested.

Figure 8:
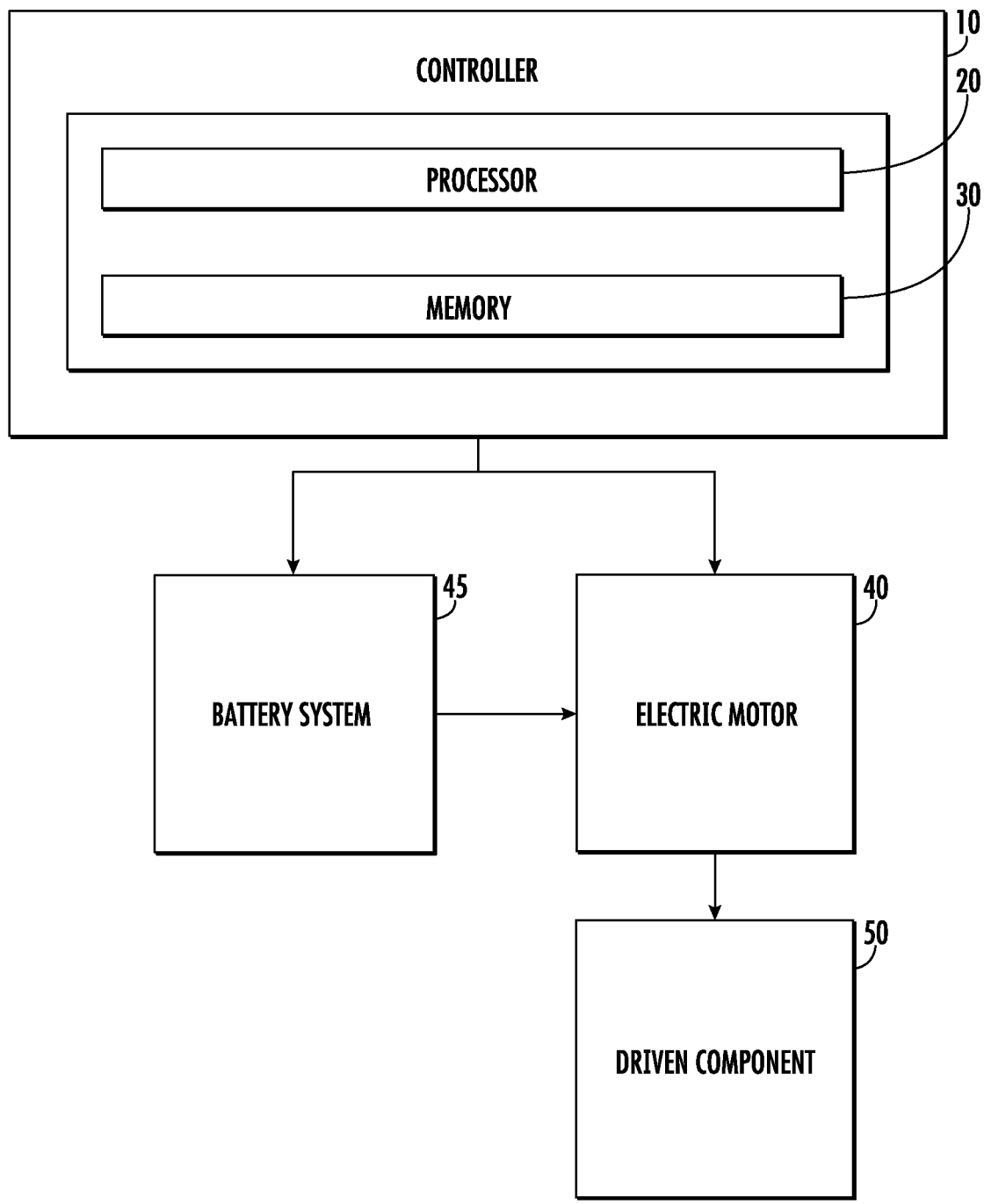
FIG. 8 is a schematic of a system provided in accordance with an embodiment of the present disclosure.

With reference to FIG. 8, an exemplary system is provided in accordance with the present disclosure. The system includes a controller 10, an electric motor 40, a battery system 45, and a driven component 50. The controller 10 includes a processor 20 and memory 30. The memory 30 may include one or more programs that are stored in the memory 30 and executed on the processor 20. The controller 10 may be operably coupled to the electric motor 40 and/or the battery system 45 such that the controller 10 operates the electric motor 40 and/or the battery system 45 based on instructions stored on the memory 30 and executed on the processor 20. The electric motor 40 may be operably coupled to a driven component 50 such that the electric motor 40 operates to rotate the driven component 50. The controller 10 may execute any of the methods detailed herein to operate the electric motor 40 and/or the battery system 45.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A method of controlling an electric motor, the method comprising:
   determining a pulsed system efficiency for an electric motor at least partially based on operating conditions of a battery system providing energy to the electric motor to deliver a requested torque; and
   operating the electric motor in a pulsed mode when the pulsed system efficiency is greater than a continuous system efficiency.

2. The method of claim 1, wherein determining the pulsed system efficiency includes the pulsed system efficiency comprising a product of a pulsed motor efficiency and a pulsed battery system efficiency.

3. The method of claim 1, wherein determining the pulsed system efficiency includes determining a pulsed battery efficiency at least partially based on a dissipated heat loss of the battery system.

4. The method of claim 1, wherein determining the pulsed system efficiency at least partially based on the operating conditions of the battery system comprises the operating conditions of the battery system including a battery temperature, a pulsing current, a battery terminal voltage, or a battery internal resistance.

5. The method of claim 1, further comprising:
   calculating the continuous system efficiency for delivering the requested torque from the electric motor in a continuous mode; and
   operating the electric motor in the continuous mode when the continuous system efficiency is greater than the pulsed system efficiency.

6. The method of claim 1, wherein determining the pulsed system efficiency includes determining a pulsed motor efficiency of the electric motor at least partially based on operating conditions of the electric motor.

7. The method of claim 6, wherein determining the pulsed motor efficiency comprises the operating conditions of the electric motor including a motor speed, a motor torque, a vehicle speed, or a motor temperature.

8. The method of claim 1, further comprising generating a pulse waveform for delivering the requested torque from the electric motor in the pulsed mode.

9. The method of claim 8, wherein generating the pulse waveform includes pulsing the electric motor at a pulse torque greater than the requested torque to deliver the requested torque.

10. The method of claim 8, wherein generating the pulse waveform includes regenerating energy between pulses of the electric motor.

11. A non-transitory computer-readable storage medium having instructions stored thereon that, when executed by a controller, cause the controller to:
    determine a pulsed system efficiency for an electric motor at least partially based on operating conditions of a battery system that is configured to provide energy to an electric motor to deliver a requested torque; and
    operate the electric motor in a pulsed mode when the pulsed system efficiency is greater than a continuous system efficiency.

12. The non-transitory computer-readable storage medium of claim 11, wherein the controller determines the pulsed system efficiency by determining a pulsed battery efficiency at least partially based on a dissipated heat loss of the battery system.

13. The non-transitory computer-readable storage medium of claim 11, wherein the controller determines the pulsed system efficiency at least partially on the operating conditions of a battery system comprises the operating conditions of the battery system including a battery temperature, a pulsing current, battery terminal voltage, or battery internal resistance.

14. The non-transitory computer-readable storage medium of claim 11, wherein the controller calculates the pulsed system efficiency based at least partially on a pulsed motor efficiency.

15. The non-transitory computer-readable storage medium of claim 11, wherein the controller is further caused to:
    calculate the continuous system efficiency for delivering the requested torque from the electric motor in a continuous mode; and
    operate the electric motor in the continuous mode when the continuous system efficiency is greater than the pulsed system efficiency.

16. A controller for operating an electric motor to rotate a driven component, the controller comprising:
- a processor; and
- a memory including a program to cause the processor to:
    - determine a pulsed system efficiency for an electric motor at least partially based on operating conditions of a battery system that is configured to provide energy to an electric motor to deliver a requested torque; and
    - operate the electric motor in a pulsed mode when the pulsed system efficiency is greater than a continuous system efficiency.

17. The controller according to claim 16, wherein determining the pulsed system efficiency includes determining a pulsed battery efficiency at least partially based on a dissipated heat loss of the battery system.

18. The controller according to claim 16, wherein determining the pulsed system efficiency at least partially on the operating conditions of a battery system comprises the operating conditions of the battery system including a battery temperature, a pulsing current, battery terminal voltage, or battery internal resistance.

19. The controller according to claim 16, wherein calculating the pulsed system efficiency is based at least partially on a pulsed motor efficiency.

20. The controller according to claim 16, wherein the program further causes the processor to:
- calculate the continuous system efficiency for delivering the requested torque from the electric motor in a continuous mode; and
- operate the electric motor in the continuous mode when the continuous system efficiency is greater than the pulsed system efficiency.

* * * * *